United States Patent
Nishimura et al.

(10) Patent No.: US 7,339,615 B2
(45) Date of Patent: Mar. 4, 2008

(54) METHOD AND APPARATUS FOR CAPTURING IMAGES AND FOR RECORDING DATA THAT INCLUDES IMAGE DATA AND AUDIO DATA SEPARATELY PREPARED FROM THE IMAGE DATA

(75) Inventors: Tomoyuki Nishimura, Asaka (JP); Masakatsu Kubota, Asaka (JP)

(73) Assignee: Fujifilm Corporation, Tokyo (JP)

( * ) Notice: Subject to any disclaimer, the term of this patent is extended or adjusted under 35 U.S.C. 154(b) by 1057 days.

(21) Appl. No.: 09/741,440

(22) Filed: Dec. 21, 2000

(65) Prior Publication Data

US 2001/0008421 A1  Jul. 19, 2001

(30) Foreign Application Priority Data

Dec. 22, 1999 (JP) .......................... HEI 11-363677

(51) Int. Cl.
*H04N 5/225* (2006.01)

(52) U.S. Cl. ................................ 348/220.1; 348/333.1; 386/121

(58) Field of Classification Search ................ 358/906, 358/909.1, 909; 348/231.3, 231.4, 231.6, 348/231.7, 222.1, 460, 515, 74, 117, 231, 348/220.1, 231.99; 386/75, 95, 97, 102, 386/68, 124, 117, 35, 21, 121, 120
See application file for complete search history.

(56) References Cited

U.S. PATENT DOCUMENTS

| | | | |
|---|---|---|---|
| 4,809,079 A * | 2/1989 | Blazek et al. ............... 386/102 |
| 4,864,425 A * | 9/1989 | Blazek et al. ............... 386/107 |
| 5,097,344 A * | 3/1992 | Aoki et al. .................... 386/39 |
| 5,130,812 A * | 7/1992 | Yamaoka ..................... 386/101 |
| 5,465,133 A * | 11/1995 | Aoki et al. .................. 348/363 |
| 5,473,370 A * | 12/1995 | Moronaga et al. ........ 348/231.1 |
| 5,648,816 A * | 7/1997 | Wakui ....................... 348/231.9 |
| 5,726,708 A * | 3/1998 | Sakai et al. .............. 348/231.4 |
| 5,982,429 A * | 11/1999 | Kamamoto et al. ..... 348/333.06 |
| 6,005,613 A * | 12/1999 | Endsley et al. .......... 348/231.6 |
| 6,034,728 A * | 3/2000 | Arena ......................... 348/372 |
| 6,346,937 B1 * | 2/2002 | Sasaki et al. ............... 345/211 |
| 6,359,649 B1 * | 3/2002 | Suzuki ..................... 348/220.1 |
| 6,400,891 B1 * | 6/2002 | Noda et al. ................. 386/120 |
| 6,442,336 B1 * | 8/2002 | Lemelson .................... 386/117 |
| 6,654,062 B1 * | 11/2003 | Numata et al. ............. 348/362 |
| 6,778,760 B1 * | 8/2004 | Kagle ........................... 386/96 |
| 2003/0099456 A1 * | 5/2003 | Ohmura et al. ............... 386/46 |
| 2003/0123859 A1 * | 7/2003 | Ikeda .......................... 386/120 |
| 2003/0193568 A1 * | 10/2003 | Yoshida et al. ........... 348/207.1 |
| 2004/0027467 A1 * | 2/2004 | Shiga ..................... 348/231.99 |

FOREIGN PATENT DOCUMENTS

JP  04-367171  12/1992

(Continued)

*Primary Examiner*—Lin Ye
*Assistant Examiner*—Nelson D. Hernandez
(74) *Attorney, Agent, or Firm*—Birch, Stewart, Kolasch & Birch, LLP

(57) ABSTRACT

A method and apparatus for recording data including image data, which includes: a recording unit 220 for recording image data; a play unit 250 for playing data including audio data; a release switch 114 for giving instructions to record image data; and a record and playback control unit 200 for giving instructions to start recording image data after giving instructions to stop playing data including audio data when a recording of image data is instructed from the release switch 114 while data including audio data is being played.

23 Claims, 4 Drawing Sheets

FOREIGN PATENT DOCUMENTS

| | | |
|---|---|---|
| JP | 06-276471 | 9/1994 |
| JP | 07-123302 | 5/1995 |
| JP | 11-341503 | 12/1999 |
| WO | WO 9965238 A1 * | 12/1999 |

* cited by examiner

METHOD AND APPARATUS FOR CAPTURING IMAGES AND FOR RECORDING DATA THAT INCLUDES IMAGE DATA AND AUDIO DATA SEPARATELY PREPARED FROM THE IMAGE DATA

This patent application claims priority from a Japanese patent application No. H11-363677 filed on Dec. 22, 1999, the contents of which are incorporated herein by reference.

BACKGROUND OF THE INVENTION

1. Field of the Invention

The present invention relates to a method and apparatus for capturing images. In particular, the present invention relates to an image capturing apparatus for recording data that includes image data, and an image capturing method that can be used for the apparatus.

2. Description of the Related Art

With the significant advancement of digital cameras, digital cameras having various functions other than a function for taking still pictures or movies have been developed.

However, because of these various functions, a new problem is on the rise. Family-type digital movies are generally known as an apparatus to record and playback animations, voices and audios. In order to switch from a playback mode to a record mode, a manual switching operation is required according to the conventional digital movies. However, when a photo opportunity arises suddenly while playing music, for a digital camera having a function to play music, there is a possibility to miss the opportunity while manually switching the operational mode. Therefore, users cannot enjoy the music casually.

SUMMARY OF THE INVENTION

Therefore, it is an object of the present invention to provide an apparatus, method, and digital camera for recording data, which overcomes the above drawbacks accompanying the conventional art. The above and other objects can be achieved by combinations described in the independent claims. The dependent claims define further advantageous and exemplary combinations of the present invention.

An image capturing apparatus for recording data including image data, which includes an image capturing unit for capturing the image data; a recording unit for recording data including the image data; a play unit for playing the recorded data; a release switch for instructing the recording unit to record the image data; and a record and playback control unit for giving an instruction to the play unit to stop playing the recorded data and subsequently giving an instruction to the image data recording unit to start recording the image data when the release switch is operated to record the image while the play unit play the recorded data.

The recorded data may include audio data, and the record and playback control unit may detect completion of recording the image data and may give an instruction to the play unit to resume playing the audio data which is once stopped playing while the recording of the image data is undertaken.

The recorded data may include audio data, and the record and playback control unit may give an instruction to the play unit to stop playing the audio data and may subsequently give an instruction to the image data recording unit to start recording the image data when a half-position state of the release switch and a full-position state of the release switch is detected.

The recorded data may include audio data, and the record and playback control unit may give an instruction to the play unit to stop playing the audio data and may subsequently give an instruction to the recording unit to undertake a recording quality adjustment processing if a half-position state of the release switch is detected while the audio data is being played.

The record and playback control unit may give an instruction to start playing the audio data when an off state of the release switch is detected without detecting the full-position state of the release switch after a half-position state of the release switch is detected while the audio data is being played.

The recorded data may include audio data; and the play unit may include an audio play unit for playing audio data.

The recorded data may include audio data; the recording unit may record the data including the image data on an external memory device connected detachably to the image capturing apparatus; and the play unit may play data recorded on the external memory device.

The image capturing apparatus may further include an external memory device control unit for undertaking control to write data including the image data on the external memory device and to read the audio data from the external memory device through the same data bus.

The recording unit may be a memory card; and the play unit may play the recorded data by reading the memory card.

The recorded data may be the image data recorded in the recording unit.

An image capturing method for recording data including image data, which includes: capturing the image data; recording data; playing the recorded data; giving an instruction to stop playing the recorded data when a release switch is operated while playing the recorded data; and giving an instruction to record the image data.

The image capturing method may further include: obtaining a state of a first switch, which functions to switch an operational mode for recording data including the image data and an operational mode for reading recorded data and for playing the read data; and forcibly suspending the playing regardless of the state of the first switch.

The recording data may include recording audio data; and the giving an instruction to start recording the image data may detect a recording completion of the image data and may give an instruction to start playing the recorded data, when a recording of the image data is undertaken while the recorded data is being played.

The giving an instruction to start recording the image data may give an instruction to start recording the image data after giving an instruction to stop playing the recorded data when a half-position state of the release switch and a full-position state of the release switch is detected.

The recording data may include recording audio data, and the giving an instruction to start recording the image data may give an instruction to start undertaking a recording quality adjustment processing after giving an instruction to stop playing the recorded data if a half-position state of the release switch is detected while the recorded data is being played.

The giving an instruction to start recording the image data may give an instruction to start playing the recorded data when an off state of the release switch is detected without detecting the full-position state of the release switch after a half-position state of the release switch is detected while the recorded data is being played.

The recording data may include recording audio data; and the playing may include playing audio data.

The recording data may include recording audio data; the recording may record the data including the image data on an external memory device connected detachably to the image capturing apparatus; and the playing may play data recorded on the external memory device.

The image capturing method may further include undertaking control to write data including the image data on the external memory device and to read the recorded data from the external memory device through the same data bus.

The recording may be a recording on a memory card; and the playing may play the recorded data by reading the memory card.

The recorded data may be the image data recorded in the recording unit.

An image capturing apparatus for recording data including image data, which includes an image capturing unit having an optical system; a recording unit having a memory device coupled to the image capturing unit, the memory recording the image data supplied from the image capturing unit; a play unit coupled to the recording unit, the play unit reading data recoded in the recording unit and playing the recorded data; an operating unit having a release switch operatively connecting to the recording unit and the play unit; and a control unit operatively connecting to the recording unit, the play unit and the operating unit, the control unit supplying a first signal to the play unit and subsequently a second signal to the recording unit in response to an operation of the release switch of the operating unit.

The first signal supplied to the play unit includes an instruction signal to stop playing the recorded data and the second signal includes an instruction signal to start recording the image when the release switch of the operating unit is operated.

The image capturing apparatus, which further includes audio signal obtaining unit coupled to the recording unit, wherein the recording unit stores therein audio data and image data and the play unit plays the audio data stored in the recording unit, and the control unit generating the first and second signal when the release switch of the operating unit is operated while the play unit plays the audio data.

The summary of the invention does not necessarily describe all necessary features of the present invention. The present invention may also be a sub-combination of the features described above. The above and other features and advantages of the present invention will become more apparent from the following description of the embodiments taken in conjunction with the accompanying drawbacks.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

The First Embodiment

Figure 1:
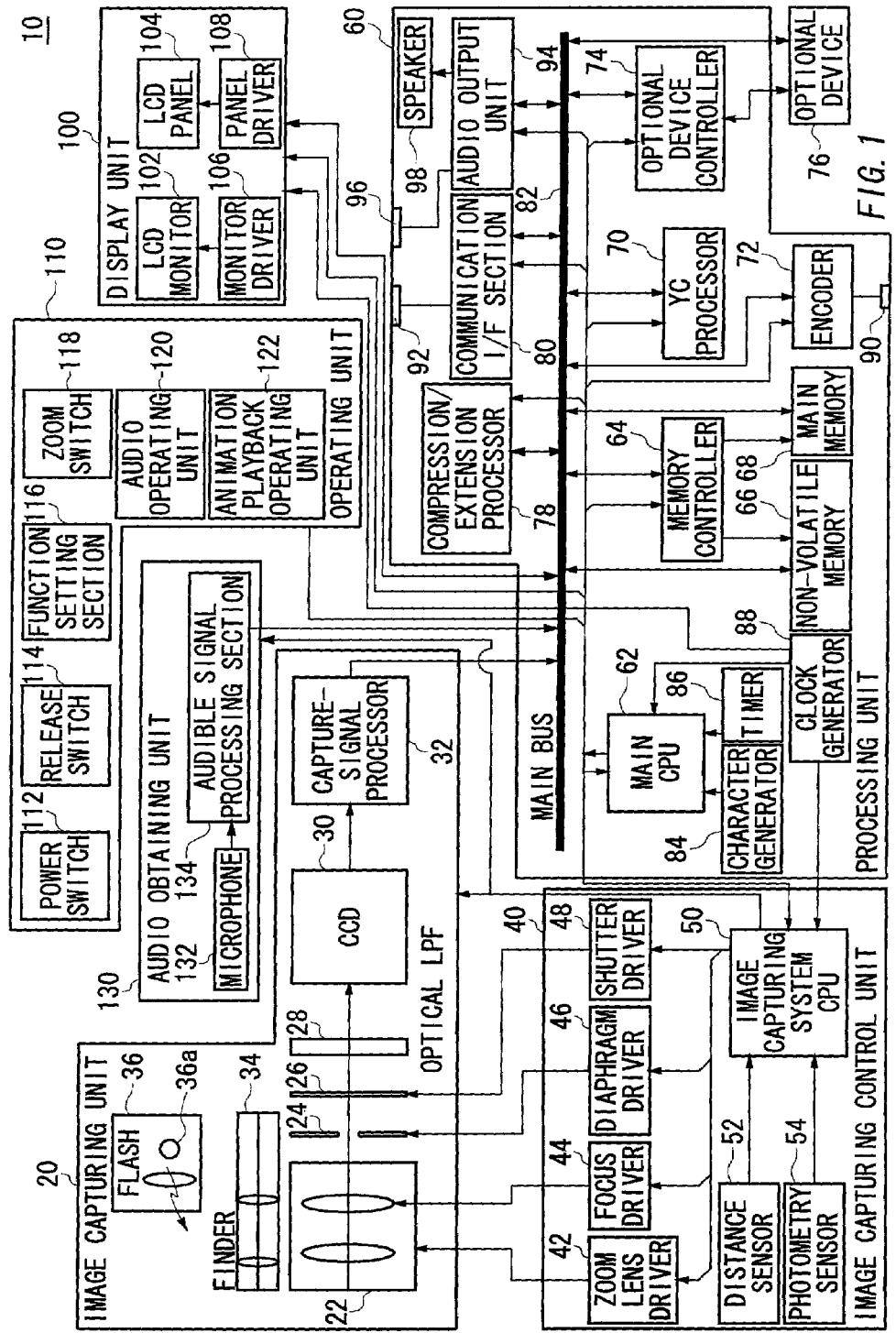
FIG. 1 is a diagram showing the entire structure of a digital camera, which is an exemplary image capturing unit, according to the first embodiment of the present invention.

FIG. 1 shows the entire structure of a digital camera, which is an exemplary image capturing apparatus, according to an embodiment of the present invention. The image capturing apparatus includes video cameras, cellular phones which have an image capturing function, and the like, other than a digital camera. A record and playback control unit will be described with reference to FIG. 2 et seq. A digital camera 10, according to the present embodiment, records and playbacks animations and audios as well as to takes still pictures. The digital camera 10 includes an image capturing unit 20, an audio obtaining unit 130, a control unit 40, a processing unit 60, a display unit 100, and an operating unit 110.

The image capturing unit 20 includes structural and electrical members pertaining to photographing and image forming. That is, image capturing unit 20 is comprised of a lens section 22, which captures an image and processes the captured image, a diaphragm 24, a shutter 26, an optical LPF or low pass filter 28, a CCD 30, and a capture-signal processor 32. The lens section 22 preferably includes a focus lens and a zoom lens. The structure makes it possible to form an image of an object on the surface of the light reception of the CCD 30. Each sensor element of the CCD 30, though it is not shown in FIG. 1, stores electric charge (referred to as "stored electric charge"). The stored electric charge is taken by a read gate pulse to a shift register not shown in FIG. 1, and subsequently taken out sequentially with a register transfer pulse as a voltage signal.

Since the digital camera 10 generally has an electric shutter function, a mechanical shutter such as the shutter 26 is not always necessary. A shutter drain is set up in the CCD 30 through a shutter gate in order to achieve the electric shutter function. When the shutter gate is activated, the stored electric charge is drained to the shutter drain. Shutter speed, which is the time to store the electric charge in each sensor element, can be controlled by controlling the shutter gate.

The voltage signal output from the CCD 30, that is, an analog signal, is color-separated by the capture-signal processor 32 into R, G and B elements, and the white balance is adjusted. The capture-signal processor 32 then undertakes a gamma correction, sequentially converts the R, G and B signals from analog into digital form by the necessary timing, and outputs the obtained digital image data (referred to as "digital image data") to the processing unit 60.

The image capturing unit 20 further includes a finder 34 and an electronic flash 36. The finder 34 may be equipped with an LCD not shown in FIG. 1. In that case, the finder 34 displays various types of information provided by a main CPU 62 described later. The electronic flash 36 acts to emit light when the energy stored in a capacitor, not shown in FIG. 1, is supplied to a discharge tube 36a.

The audio obtaining unit 130 includes structural and electrical members for obtaining external sounds. The audio obtaining unit 130 is comprised of a microphone 132, which catches sounds and processes, and an audible signal processing section 134. The audible signal processing section 134 converts audible signals, which the microphone 132 has caught, from analog to digital in the required timing and outputs the obtained audio data (hereinafter referred to as "digital audio data"), to the processing unit 60. The audible signal processing unit 134 may undertake such processes as to reduce noises and to adjust voice levels.

The control unit 40 is comprised of a zoom lens driver 42, a focus driver 44, a diaphragm driver 46, a shutter driver 48, an image capturing system CPU 50, which controls all of the above-mentioned drivers, a distance sensor 52, and a photometry sensor 54. Each of the drivers such as the zoom lens driver 42 has a driving means such as a stepping motor or the like. In response to a snap of a release switch 114 described later, the distance sensor 52 gauges the distance defined between the camera and the object, and the photometry sensor 54 measures the brightness of the object. The gauged distance data (referred to as "gauged distance data") and the measured brightness data of the object (referred to as "measured luminance data") are transmitted to the controlling system CPU 50. The controlling system CPU 50 controls the zoom lens driver 42 and the focus driver 44 based on the photograph information provided by a user such as the magnification of the zoom lens, and makes adjustments of the magnification of the zoom lens and focus for the lens section 22.

The controlling system CPU 50 determines an aperture value and a shutter speed, based on the integrated value of digital signals of RGB in one image frame, which is called AE information. According to the aperture value and the shutter speed thus determined, the diaphragm driver 46 and the shutter driver 48 respectively adjust the amount of aperture and then drives the shutter 26 to open and close.

The controlling system CPU 50 also controls the emission of light intensity from the electronic flash 36 based on the measured brightness data, and simultaneously adjusts the amount of aperture of the diaphragm 24. When a user instructs a camera to pick up an image, the CCD 30 starts to store the electric charge. Then, the stored electric charge is output to the capture-signal processor 32 after the expiration of the shutter time calculated on the basis of the measured brightness data.

The processing unit 60 is comprised of a main CPU 62, which controls the whole digital camera 10, especially controlling the processing unit 60 itself, a memory controller 64, which is controlled by the main CPU 62, a YC processor 70, an optional device controller 74, a compression/extension processor 78, a communication interface (I/F) section 80, and an audio output unit 94. The main CPU 62 notifies necessary information with the image capturing system CPU 50 by serial communication, for example. A clock generator gives an operating clock of the main CPU 62. The clock generator 88 also provides clocks of different frequencies respectively to the image capturing system CPU 50 and the display unit 100.

The main CPU 62 is also comprised of a character generator 84 and a timer 86. The timer 86 is backed up by batteries and continuously counts the time and date. This count value gives the main CPU 62 information about the time and date of a photograph and other time information. The character generator 84 generates character information such as the time and date of a photograph or a title. This character information will then be appropriately superimposed with a photographic image.

The memory controller 64 controls a non-volatile memory 66 and a main memory 68. The non-volatile memory 66 is comprised of components such as an EEPROM or electrically-erasable programmable ROM, and a flash memory. The non-volatile memory 66 stores data such as setting information set by a user or an adjustment value before shipment, which should be kept even when the power of the digital camera 10 is turned off. The non-volatile memory 66 may store a boot program or a system program of the main CPU 62 if necessary. On the other hand, the main memory 68 may generally be a relatively inexpensive memory having a large capacity such as a DRAM. The main memory 68 has: a frame memory function, which stores data output from the image capturing unit 20 and the audio obtaining unit 130; a system memory function, which is loaded with various programs; and a work area function. The non-volatile memory 66 and the main memory 68 control the transmission of data back and forth among the components at the inside and outside of the processing unit 60 via a main bus 82.

The YC processor 70 undertakes a Y-to-C conversion on digital image data and generates a luminance signal Y and a chrominance signal B-Y and R-Y. The memory controller 64 temporarily stores the luminance signal and the chrominance signal in the main memory 68. The compression/extension processor 78 sequentially reads the luminance signal and the chrominance signal from the main memory 68. The compression/extension processor then compresses the luminance signal and the chrominance signal. A memory card, which is one kind of the optional device 76, writes through the optional device controller 74 the compressed data described above (referred to as "compressed data").

The processing unit 60 further includes an encoder 72. The encoder 72 inputs a luminance signal and a chrominance signal. Then, the encoder 72 converts the luminance signal and the chrominance signal into video signals such as National Television System Committee (NTSC) and Phase Alternation by Line (PAL) signals. The encoder 72 outputs the converted video signals through a video output terminal 90. In order to generate a video signal from the data recorded in the optional device 76, firstly the data is transmitted to the compression/extension processor 78 through the optional device controller 74. Then, the data, which has been subjected to a necessary process by the compression/extension processor 78, is converted into a video signal by the encoder 72.

The optional device controller 74 undertakes a generation of necessary signals, a logic conversion, and a voltage conversion, between the main bus 82 and the optional device 76. If an external storage device such as a memory card is connected as the optional device 76, reading and writing of data can be undertaken through the same data bus. In this case, an external storage device control unit as an example of the optional device controller 74 controls reading and writing data through the same data bus. The digital camera 10 may support, for example, an I/O card, which is a standard PCMCIA-compliant card, other than the above-described memory card, as an optional device 76. In this case, the optional device controller 74 may include a bus control LSI for PCMCIA.

The communication I/F section 80 functions to control such as a protocol conversion based on a communication specification for which the digital camera 10 supports, that is, a specification such as USB, RS-232C, or Ethernet, for example. The communication I/F section 80 may be provided with a driver IC if necessary, and communicates through external devices including networks and a connector 92. Other than those standard specifications, the communication I/F section can have a structure which exchanges data, through a particular interface, with an external device such as a printer, a karaoke device, or a game device.

The audio output unit 94 undertakes the process to output audio data, which is read from the main memory 68 or the optional device 76, to an external device such as headphones, through a speaker 98 or a connection terminal 96. In particular, processing for a digital-analog conversion, a stretch, and amplification, for example, are conducted. A part of, or all of, these processes may be undertaken by the main CPU 62.

The display unit 100 is comprised of an LCD monitor 102 and an LCD panel 104. A monitor driver 106 and a panel driver 108 respectively control the LCD monitor 102 and the LCD panel 104. The LCD monitor 102 may be, for example, a 2-inch monitor, and is set in the back of a camera. The LCD monitor 102 displays the modes of the present photographs and plays, magnification of the zoom lens for photographing and playing, the amount of energy left in batteries, time and date, a display for setting a mode, and subject images. The LCD panel 104 may be, for example, a small monochrome LCD, and is set on the top of a camera. The LCD panel 104 simply displays information such as the image quality described as FINE/NORMAL/BASIC, on/off of the electronic flash, the standard number of possible photographs, the number of pixels, and the amount of power left in the batteries.

The operating unit 110 is comprised of apparatuses and electric members, which are necessary for a user to set or instruct the operation or the mode of the operation of the digital camera 10. The power switch 112 determines whether the power of the digital camera 10 is turned on or off. The release switch 114 has a two-step structure of switch positions, including two switches to be operated respectively in the two types of position state: the half-position state and the full-position state. For example, the half-position switch undertakes a recording quality adjustment processing, such as an auto focus and auto exposure. Subsequently, the full-position switch captures data such as an image and audio.

Then, after necessary processes such as signal processing and the compression of data, the captured image will be stored in the main memory 68 or the optional device 76. The operating unit 110 may have a setting such as a rotary dial for mode or a cross key other than the power switch 112 and the release switch 114. The dial for mode and the cross key are collectively referred to as a function setting section 116 as in FIG. 1. The zoom switch 118 is operated to set the zoom magnification. Examples of an operation or a function include "file format", "special effects", "photographic printing", "confirm/save", and "display switching", which can be designated by using the operating unit 110. The audio operating unit 120 includes an operational key for playing audio data. An animation playback operating unit 122 includes an operational key for playback of animation data. The audio operating unit 120 an the animation playback operating unit 122 include keys such as "play", "stop", "forward", "backward", "invert", and "pause", as examples.

The main operations according to the structures described above are as follows.

First, a power switch 112 of the digital camera 10 is turned on. Electric power is supplied to each part of the camera. The main CPU 62 judges the mode of the digital camera 10, by reading the state of the function setting section 116. The mode is selected from among a still picture photograph mode, a still picture play mode, an animation photograph mode, an animation play mode, a music play mode, a function setting mode, and a data transfer mode.

If the digital camera 10 is in the still picture photograph mode, the main CPU 62 monitors the half-position state of the release switch 114. When the main CPU 62 detects the half-position state, the main CPU 62 obtains photometry data and distance data from the photometry sensor 54 and the distance sensor 52, respectively. The control unit 40 operates based on the obtained data, and adjustments, such as focus and an aperture of the photographic lens 22, are made. When the adjustments are completed, the main CPU 62 displays letters such as "standby" on the LCD monitor 102 to notify the state to a user.

Then, the main CPU 62 monitors the full-position state of the release switch 114. When the release switch 114 is pressed to the full-position, the shutter 26 is closed after a predetermined shutter time, and the stored electrical charge of the CCD 30 is drained to the image capturing signal processor 32. The digital image data generated by the result of the process undertaken by the image capturing signal processor 32 is output to the main bus 82. The generated digital image data is temporarily stored in the main memory 68. Then, the stored digital image data is processed at the YC processor 70 and the compression/extension processor 78. The processed digital image data is recorded in the optional device 76 via the optional device controller 74. The recorded digital image data is displayed on the LCD monitor 102 in the frozen state for a period of time. Therefore, a user can check the photographed image. This process completes a series of photographing operations.

If the digital camera 10 is in the still picture play mode, the main CPU 62 reads image data of the picture taken last time from the main memory 68 through the memory controller 64. The main CPU 62 then displays the image on the LCD monitor 102 of the display unit 100. If a user instructs "next" or "back" at the function setting section 116, a photographed image taken before and after the presently displaying image is displayed on the LCD monitor 102.

If the digital camera 10 is in the animation photograph mode, the main CPU 62 monitors the half-position state of the release switch 114. When the main CPU 62 detects the half-position state, the main CPU undertakes a recording quality adjustment processing as in the still picture photograph mode described above. The main CPU then monitors the full-position state of the release switch 114. When the release switch 114 is pressed to the full-position state, the stored electric charge of the CCD 30 is drained to the image capturing signal processor 32 based on the predetermined synchronized signal. Digital image data is sequentially stored in the optional device 76 by undertaking the same processes as in the still picture photograph mode. At the same time, audio data obtained by the audio obtaining unit 130 is sequentially stored in the optional device 76. The main CPU 62 monitors the half-position state of the release switch 114 while recording animation. When the main CPU 62 detects the half-position state, the main CPU 62 stops recording animation and audio.

If the digital camera 10 is in the animation play mode or the music play mode, the main CPU 62 reads animation data or audio data from the optional device 76 through the optional device controller 74, based on the instruction of a user, which is communicated by the operating unit 110. For animation data, the animation data is given necessary processes at the compression/extension processor 78, the YC processor 70, and the audio output unit 94. The image of the animation data is then displayed on the LCD monitor of the display unit 100. Audio is then output to the headphone connection terminal 96 or the speaker 98. For audio data, the audio data is given processes necessary for outputting audio at the audio output unit 94. The audio is output to headphones through the headphone connection terminal 96. The voice may be output to the speaker 98. A user communicates the instructions, such as "play", "stop", "forward", "backward", "inverse", and "pause," through the function setting section 116, the audio operating unit 120, or the animation playback operating unit 122. Thus, a user can play desired data.

Figure 2:
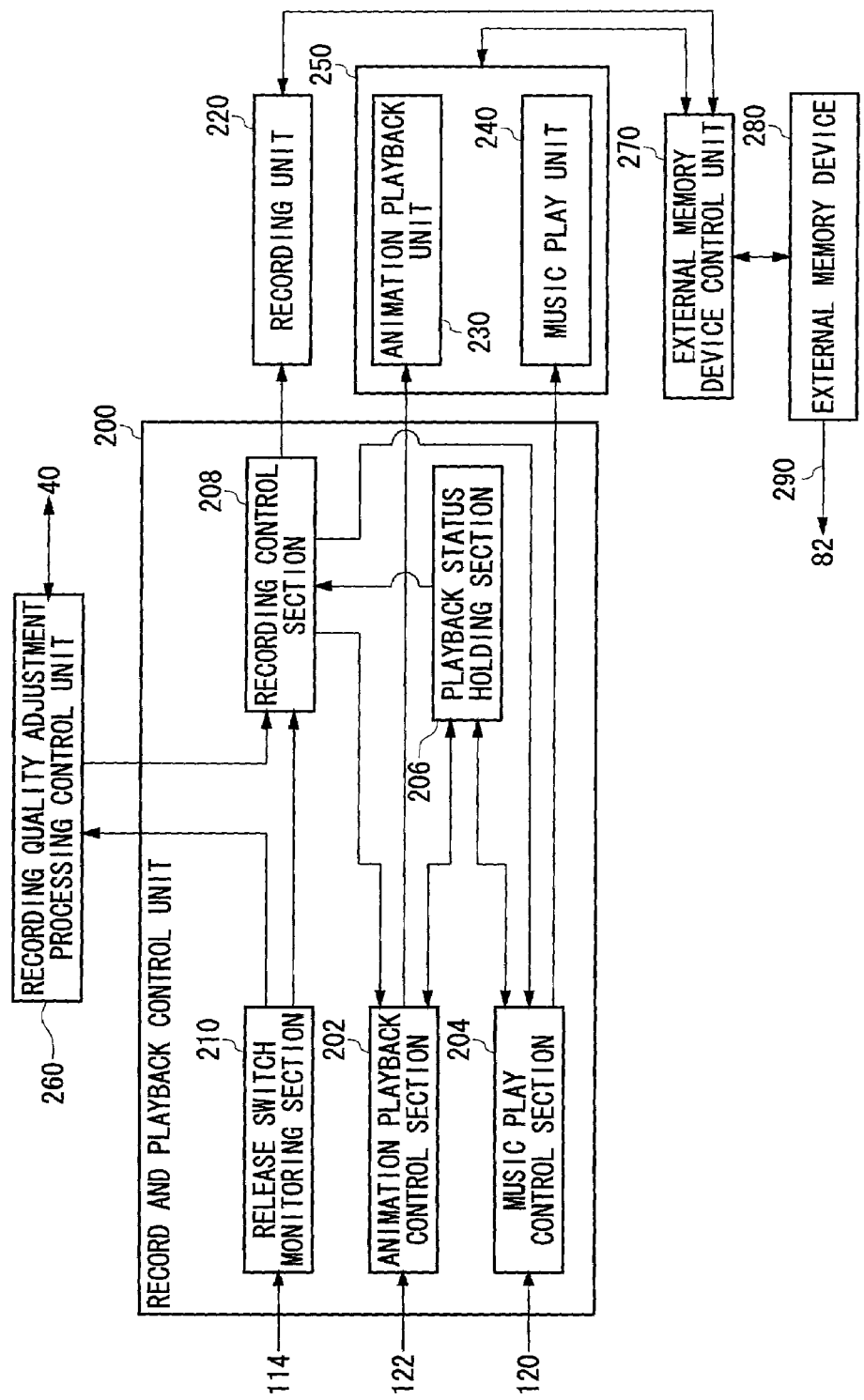
FIG. 2 is an outlined structural block diagram of a record and playback control unit according to the first embodiment of the present invention.

FIG. 2 is a functional block diagram showing the outline of a record and playback control unit, which is achieved by the processing unit 90 and the optional device 76 shown in FIG. 1. The functions of the record and playback control include a record and playback control unit 200, a recording unit 220, a playback unit 250, a recording quality adjustment processing control unit 260, an external memory device control unit 270, and an external memory device 280. The record and playback control unit 200 includes an animation playback control section 202, a music play control section 204, a playback status holding section 206, a recording control section 208, and a release switch monitoring section 210. The record and playback control unit 200 can be established by working with the main CPU 62 in FIG. 1 and a program stored or loaded in the main memory 68 or the non-volatile memory 66, for example. If the main CPU 62 has a built-in memory, various functions may be achieved as a firmware by storing programs necessary for the built-in memory. Although FIG. 2 shows various functions of the record and playback control unit 200 as a structure of integrated modules, these functions practically and necessarily do not have to be physically integrated. The design to achieve functions of the record and playback control unit 200 for the digital camera 10 has considerable flexibility.

The animation playback control section 202 controls operations of the animation playback unit 230 by receiving the instruction from a user communicated through the animation playback operating unit 122, the instructions from the recording control section 208, and the playback status hold in the playback status holding section 206. Simultaneously, playback status such as "animation playing", "animation play stopped", "animation play pausing", and "animation play suspended" are notified to the playback status holding section 206. The "animation play suspended" shows, as described later, the status when an animation play is suspended while recording operation is conducted, when the release switch 114 is pressed and starts recording an image while playing an animation. When a request for playing is notified from the animation playback operating unit 122 while the playback status is "animation play stopped," the animation playback control section 202 instructs the animation playback unit 230 to start playing the animation, and updates the playback status hold in the playback status holding section 206 as "animation playing," which is an example of the operations of the animation playback control section 202.

The music play control section 204 controls operations of the music play unit 240 by receiving the instruction from a user communicated through the audio operating unit 120, the instructions from the recording control section 208, and the playback status hold in the playback status holding section 206. Simultaneously, playback status such as "music playing", "music play stopped", "music play pausing", and "music play suspended" are notified to the playback status holding section 206. When a request for suspending playing is notified from the recording control section 208 while the playback status is the "music playing," the music play control section 204 instructs the music play unit 240 to suspend playing the music, and updates the playback status hold in the playback status holding section 206 as "music play suspended," for example.

The playback status holding section 206 maintains the animation play status notified from the animation playback control section 202 and the music play status notified from the music play control section 204. When the digital camera is in the animation play mode, the playback status holding section 206 maintains the animation playback status. When the digital camera 10 is in the audio play mode, the playback status holding section 206 maintains the music play status. The animation playback status and the music play status may be kept separately.

The release switch monitoring section 210 monitors the half-position state and the full-position state of the release switch 114. Data according to the respective states is notified to the recording quality adjustment processing control unit 260 and the recording control section 208. When the release switch monitoring section 210 detects the half-position state of the release switch 114, the release switch monitoring section 210 notifies a request to start a recording quality adjustment processing to the recording quality adjustment processing control unit 260 and a request to pause recording to the recording control section 208. Then, if the release switch monitoring section 210 detects the full-position state of the release switch 114, the release switch monitoring section 210 notifies a request to start recording to the recording control section 208. If the release switch monitoring section 210 does not detect the full-position state of the release switch 114 and detects the off state of the release switch 114, the release switch monitoring section 210 notifies a request to finish the recording quality adjustment processing to the recording quality adjustment processing control unit 260 and a request to cancel the pause for recording to the recording control section 208.

The recording control section 208 controls the recording process of the recording unit 220 by receiving data notified from the release switch monitoring section 210, the recording quality adjustment processing control unit 260, the playback status holding section 206, and the recording unit 220. The recording control section 208 refers to the playback status kept in the playback status holding section 206 when a request to pause for recording is notified from the release switch monitoring section 210. If the playback status is "animation playing" or "music playing," the recording control section 208 notifies a request to suspend playing to the animation playback control section 202 or the music play control section 204. If the playback status is other than the "animation playing" or "music playing," the recording control section 208 does not notify a request to suspend playing. Every time the recording control section 208 receives a request to pause for recording, the recording control section 208 may always notify a request to suspend playing and subsequently the animation playback control section 202 and the music play control section 204 select may select whether or not to suspend playing.

When the recording control section 208 receives a request to start recording from the release switch monitoring unit 210, the recording control section 208 pauses for a signal notifying the completion of the recording quality adjustment processing, which is notified from the recording quality adjustment processing control unit 260. When the signal notifying the completion of the recording quality adjustment processing is notified, the recording control section 208 instructs the recording unit 220 to start recording. Therefore, the recording control section 208 records data after confirming a predetermined recording quality.

The recording control section 208 refers to the playback status kept in the playback status holding section 206 when a request to cancel the pausing for recording is notified from the release switch monitoring section 210. If the playback status is the "animation playback suspended" or the "music play suspended," the recording control section 208 notifies a request to start playing to the animation playback control section 202 and the music play control section 204. If the playback status is other than "animation play suspended" or "music play suspended," the recording control section 208 does not notify a request to start playing. Therefore, when a user presses the release switch 114 to the half-position state to start recording images while playing animation or music, and when a user releases the release switch 114 after the suspension to stop recording images, the animation or the music restarts playing without operating a key.

When the recording control section 208 detects completion of the recording process of the recording unit 220, the recording control section 208 refers the playback status kept in the playback status holding section 206. If the playback status is "animation play suspended" or "music play suspended," the recording control section 208 notifies a request to start playing to the animation playback control section 202 or the music play control section 204. If the playback status is other than "animation play suspended" or "music play suspended," the recording control section 208 does not notify a request to start playing. Therefore, when play is suspended while playing in order to start recording, a user starts playing animation or music without operating a key, after the recording process has been completed.

The recording unit 220 includes members necessary to receive instructions notified from the recording control section 208 and to undertake a recording process. The recording unit 220, for example, is achieved by instructing the image capturing unit 20, the audio obtaining unit 130, the compression/extension processor 78, the YC processor 70, the memory controller 64, and the optional device controller 74 to undertake necessary processes in cooperation with the main CPU 62 using programs stored or loaded in the main memory 78 or the non-volatile memory 66, as shown in FIG. 1.

The playback unit 250 includes an animation playback unit 230 and a music play unit 240. The animation playback unit 230 includes members necessary to receive instructions notified from the recording control section 208 and to undertake a recording process. The animation playback unit 230, for example, is achieved by instructing the optional device controller 74, the compression/extension processor 78, the YC processor 70, the audio output unit 94, and the display unit 100 to undertake necessary processes in cooperation with the main CPU 62 using programs stored or loaded in the main memory 78 or the non-volatile memory 66, as shown in FIG. 1.

The music play unit 240 includes members necessary to receive instructions notified from the music play control section 204 and to undertake audio processing. The music play unit 240, for example, is achieved by instructing the optional device controller 74, the compression/extension processor 78, the YC processor 70, and the audio output unit 94 to undertake necessary processes in cooperation with the main CPU 62 using programs stored or loaded in the main memory 78 or the non-volatile memory 66, as shown in FIG. 1.

The recording quality adjustment processing control unit 260 receives a request to start the recording quality adjustment processing notified from the release switch monitoring section 210. The recording quality adjustment processing control section 260 then instructs the control unit 40 to start the recording quality adjustment processing. When a predetermined recording quality is secured by conducting the recording quality adjustment processing, the recording quality adjustment processing control section 260 finishes the recording quality adjustment processing and maintains the recorded data in that state. The recording quality adjustment processing control section 260 then notifies a signal notifying the completion of the recording quality adjustment processing to the recording control section 208.

The external memory device 280 is an example of the optional device 76 in FIG. 1. The external memory device 280 includes a memory card, a flash memory, and an external storage device connected detachably to the digital camera 10. The external memory device 280 stores static image data, animation data, audio data, and the like in a predetermined format, respectively. The external memory device 280 writes data through the data bus 290. The external memory device 280 reads data through the data bus 290.

The external memory device control unit 270 is an example of the optional device controller 74. The external memory device control unit 270 controls writing data, including image data, on the external memory device 280 and reading data, including audio data, from the external memory device 280 through the same data bus 290.

Figure 3:
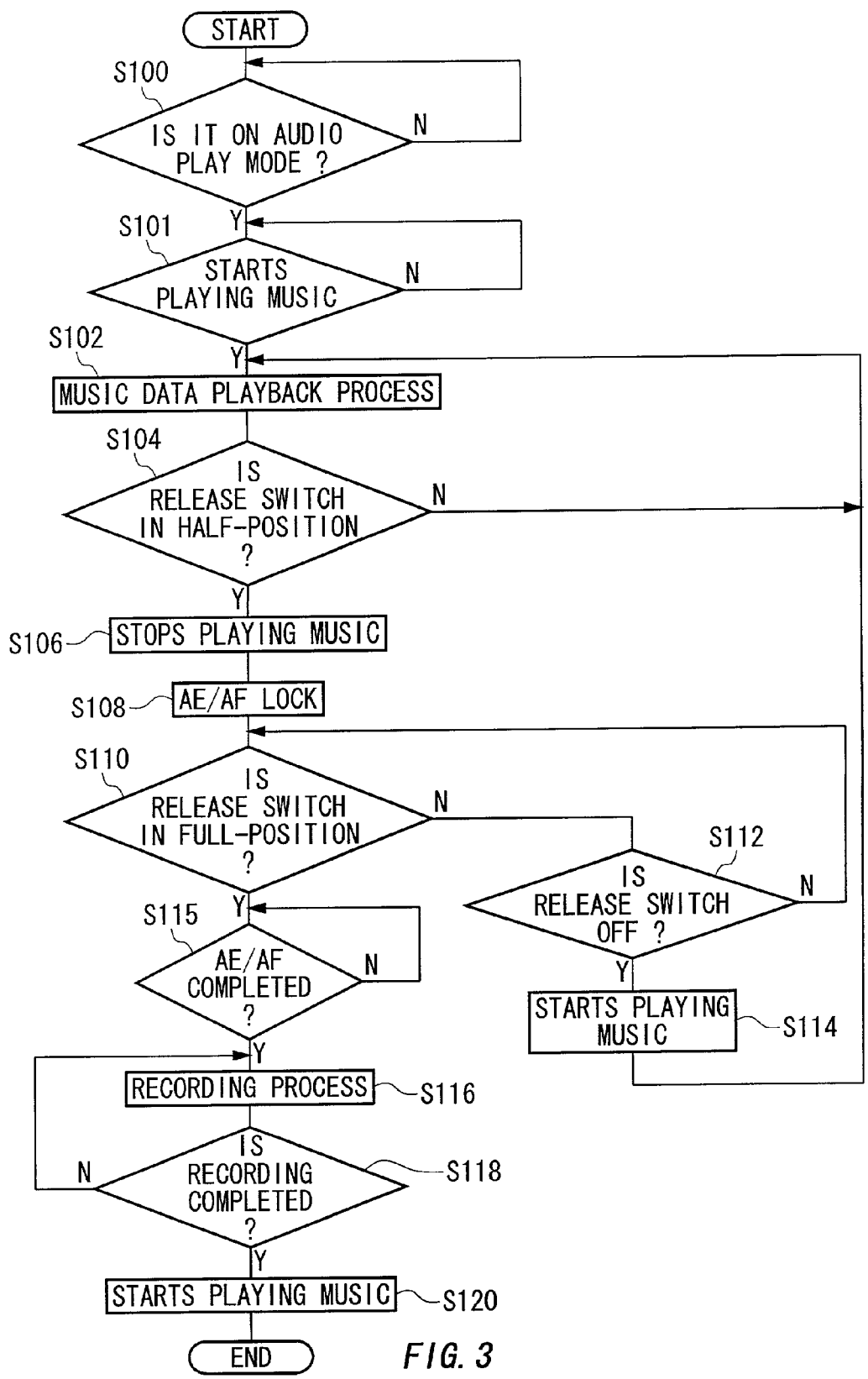
FIG. 3 is a flowchart showing the steps of a data recording method according to the first embodiment of the present invention.

FIG. 3 is a flowchart showing an image capturing method for a digital camera, which is an exemplary image capturing apparatus, according to the present embodiment. This flowchart shows the operations that take place when a user presses the release switch 114 while playing data such as animation or music. The operations that take place when a user presses the release switch 114 while playing music, as an example, are described in the following.

If the power switch 112 of the digital camera 10 is turned on and electric power is supplied to each part of the camera, the main CPU 62 receives the data on the status of the function setting section 116 and detects the operational mode, at step S100. If the operational mode is set in other than the audio play mode, the process goes to N, and processes according to the operational mode are undertaken. If the operational mode is set in the audio play mode, the process goes to Y, and the music play control section 204 monitors the status of the audio operating unit 120, at step S101. The process until the audio operating unit 120 notifies a request to play, the process goes to N, and processes according to requests notified from the audio operating unit 120, though not shown in the Figures. If the audio operating unit 120 notifies a request to play, the process goes to Y, and the audio data recorded on the external memory device 280 is played, at step S102.

The release switch monitoring section 210 monitors the half-position state of the release switch 114 while audio data is played, at step S104. If the half-position state is not detected, the process goes to N, and the audio play processing continues, at step S102. If the half-position state is detected, the process goes to Y, and the recording control section 208 notifies a request to suspend playing music to the music play control section 204. Then, the audio play processing is forced to be suspended regardless of the status of the function setting section 116, at step S106. Consequently, the recording quality adjustment processing control unit 260 instructs the control unit 40 to start the recording quality adjustment processing, such as an auto exposure adjustment processing and an auto focus processing, at step S108.

The release switch monitoring section 210 monitors the full-position state of the release switch 114, at step S110. If the full-position state of the release switch 114 is not detected, the process goes to N, and the release switch monitoring section 210 monitors the off state of the release switch 114, at step S112. If the off state is not detected, the process goes to N, and the release switch monitoring section 210 monitors the full-position state of the release switch 114, at step S110. If the off state is detected, the process goes to Y, and the release switch monitoring section 210 notifies a request to cancel the pausing for recording to the recording control section 208. Then, the recording control section 208 notifies a request to start playing to the music play control section 204, and the audio play starts again, at step S114. Therefore, if a user presses the release switch 114 and the audio play is suspended, the user can restart the audio play without operating a key if the user releases the release switch 114. Consequently, the release switch monitoring section 210 monitors the half-position state of the release switch 114, at step S102.

If the full-position state of the release switch 114 is detected at step S110, the process goes to Y, and the recording quality adjustment processing control unit 260 detects whether or not the recording quality adjustment processing has been completed, at step S115. While the recording quality adjustment processing is conducted, the process goes to N, and the recording quality adjustment processing continues. If the recording quality adjustment processing is completed, the process goes to Y, and the recording control section 208 notifies a request to start recording to the recording unit 220. Then, the recording process starts, at step S116. Consequently, the recording control section 208 monitors the completion of the recording, at step S118. When recording static image, the recording unit 220 notifies the completion of the recording process to the recording control section 208. When recording animation data, the release switch monitoring section 210 monitors the half-position state of the release switch 114 and notifies the completion of the recording to the recording control section 208 if the half-position state is detected. Then, the recording control section 208 instructs the recording unit 220 to finish recording. Until the completion of the recording, the process goes to N, and the recording process continues, at step S118. If the completion of the recording is detected, the process goes to Y, and the recording control section 208 notifies a request to restart to the music play control section 204. Then, the audio play processing starts again, at step S120. Therefore, if the audio play is suspended by the recording process, a user can restart the audio play without operating a key if the recording process is completed. The audio play processing may be stopped instead of restarting. When the recording process is completed, the power to units, which does not operate while playing the audio, such as the image capturing unit 20, the audio obtaining unit 130, and the control unit 40, may be turned off. Turning off power to these units can save power.

When the release switch 114 is pressed while playing animation, the same recording process is undertaken as described above.

Based on the digital camera 10 as an example of the image capturing apparatus and the image capturing method according to the present embodiment, a user can take a picture immediately by simply pressing the release switch 114 even if a need for taking a picture comes suddenly when the user is playing animation or audio. Moreover, since the reading is stopped before writing, the amount of buffer memory can be saved, thereby the digital camera 10 can be downsized and lightened. Further, since the play processing is stopped before the recording quality adjustment processing is conducted, the load on the CPU can be lightened. Even in the case that the data bus 290 for reading data from the external memory device 280 and the data bus 290 for writing data to the external memory device 280 is the same, reading and writing can be controlled so that the reading and writing are not conducted simultaneously.

The Second Embodiment

Figure 4:
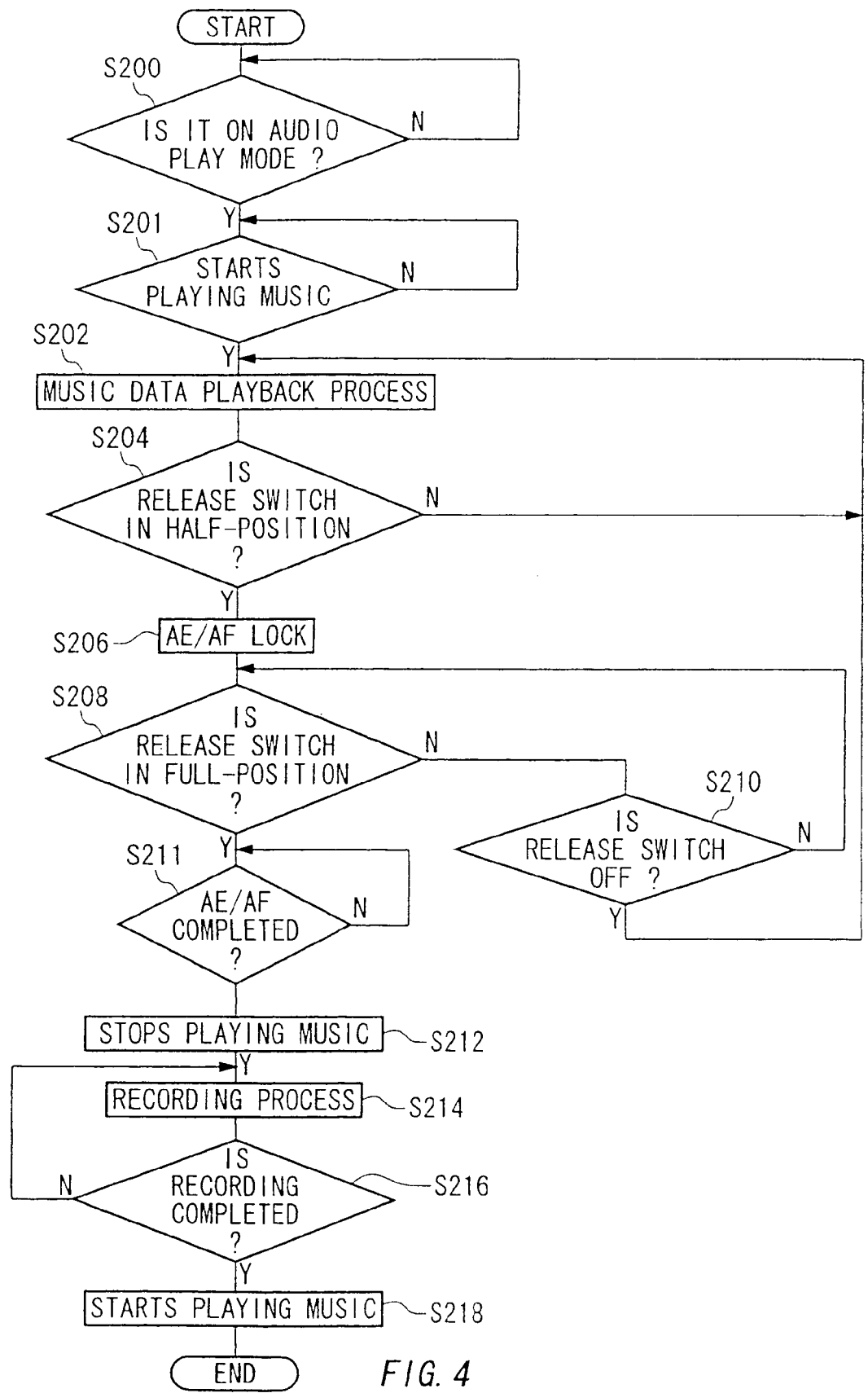
FIG. 4 is a flowchart showing the steps of a data recording method according to the second embodiment of the present invention.

FIG. 4 is a flowchart showing an image capturing method for a digital camera, which is an exemplary image capturing apparatus, according to the present embodiment. The entire structure of the digital camera 10 according to the present embodiment is the same as the digital camera 10 according to the first embodiment shown in FIG. 1. The structure of the record and playback control unit 200 of the digital camera 10 according to the present embodiment is the same as the structure of the record and playback control unit 200 according to the first embodiment shown in FIG. 1. According to the present embodiment, when the recording control section 208 receives a request to pause for a recording from the release switch monitoring section 210, the recording control section 208 does not notify a request to suspend playing to the animation playback control section 202 or the music play control section 204. When the recording control section 208 receives a request to start recording from the release switch monitoring section 210, the recording control section 208 notifies a request to start recording to the recording unit 220 after communicating a request to suspend playing to the animation playback control section 202 or the music play control section 204.

The flowchart shown in FIG. 4 shows the operations that take place when the release switch 114 is pressed while data such as animation and music is being played. The operations that take place when a user presses the release switch 114 while playing music, as an example, are described in the following.

If the power switch 112 of the digital camera 10 is turned on and electric power is supplied to each part of the camera, the main CPU 62 receives data on the status of the function setting section 116 and detects the operational mode, at step S200. If the operational mode is set in other than the audio play mode, the process goes to N, and processes according to the operational mode are undertaken. If the operational mode is set in the audio play mode, the process goes to Y, and the music play control section 204 monitors the status of the audio operating unit 120, at step S201. The process until the audio operating unit 120 notifies a request to play, the process goes to N, and processes according to requests notified from the audio operating unit 120, though not shown in the Figures. If the audio operating unit 120 notifies a request to play, the process goes to Y, and the audio data recorded on the external memory device 280 is played, at step S202.

The release switch monitoring section 210 monitors the half-position state of the release switch 114 while audio data is played, at step S204. If the half-position state is not detected, the process goes to N, and the audio play processing continues, at step S202. If the half-position state is detected, the process goes to Y, and the recording quality adjustment processing control unit 260 instructs the control unit 40 to start the recording quality adjustment processing, such as an auto exposure adjustment processing and an auto focus processing, at step S206.

The release switch monitoring section 210 monitors the full-position state of the release switch 114, at step S208. If the full-position state of the release switch 114 is not detected, the process goes to N, and the release switch monitoring section 210 monitors the off state of the release switch 114, at step S210. If the off state is not detected, the process goes to N, and the release switch monitoring section 210 monitors the full-position state of the release switch 114, at step S208. If the off state is detected, the process goes to Y, and the audio play processing continues. Then, the release switch monitoring section 210 monitors the half-position state of the release switch 114, at steps S202 and S204.

If the full-position state of the release switch 114 is detected at step S208, the process goes to Y, and the recording quality adjustment processing control unit 260 detects whether or not the recording quality adjustment processing has been completed, at step S211. While the recording quality adjustment processing is conducted, the process goes to N, and the recording quality adjustment processing continues. If the recording quality adjustment processing is completed, the process goes to Y, and the recording control section 208 notifies a request to suspend playing music to the music play control section 204. Then, the audio play processing is forced to be suspended regardless of the status of the function setting section 116, at step S212. The audio play processing may be suspended without pausing for the completion of the recording quality adjustment processing. Consequently, the recording control section 208 notifies a request to start recording to the recording unit 220, and the recording process starts, at step S214. Consequently, the recording control section 208 monitors the completion of the recording, at step S216. Until the completion of the recording, the process goes to N, and the recording process continues. If the completion of the recording is detected, the process goes to Y, and the recording control section 208 notifies a request to restart to the music play control section 204. Then, the audio play processing starts again, at step S218. Therefore, if the audio play is suspended by the recording process, a user can restart the audio play without operating a key if the recording process is completed.

When the release switch 114 is pressed while playing animation, the same recording process is undertaken as described above.

Based on the digital camera 10 as an example of the image capturing apparatus and the image capturing method according to the present embodiment, the time for the play processing to be suspended can be minimized since the play processing is stopped immediately before the recording process is conducted.

As is obvious from the above description, a method and apparatus for capturing images, which are user-friendly, are provided according to the present invention.

Although the present invention has been described by way of exemplary embodiments, it should be understood that those skilled in the art might make many changes and substitutions without departing from the spirit and the scope of the present invention, which is defined only by the appended claims.

What is claimed is:

1. An image capturing apparatus, comprising:
   an image capturing unit for capturing image data;
   a recording unit for recording data including the image data and audio data separately prepared from the image data;
   a play unit for playing the recorded data;
   a release switch for instructing said recording unit to record the image data and instructing said play unit to play said audio data;
   a function setting section for switching an operational mode for recording the image data and an operational mode for playing the recorded data; and
   a record and playback control unit for giving an instruction to said play unit to stop playing said recorded data and subsequently giving an instruction to said image data recording unit to start recording the image data, without switching the operational mode, when said release switch is operated once to record the image while said play unit plays the recorded data,
   wherein playback of said audio data can be resumed substantially immediately after the recording unit has recorded the image data.

2. The image capturing apparatus as claimed in claim 1, wherein said record and playback control unit detects completion of recording the image data and gives an instruction to said play unit to resume playing the audio data which is once stopped playing while the recording of the image data is undertaken.

3. The image capturing apparatus as claimed in claim 1, wherein said record and playback control unit gives an instruction to said play unit to stop playing the audio data and subsequently gives an instruction to said image data recording unit to start recording the image data when a half-position state of said release switch and a full-position state of said release switch is detected.

4. The image capturing apparatus as claimed in claim 3, wherein said record and playback control unit gives an instruction to start playing said audio data when an off state of said release switch is detected without detecting said full-position state of said release switch after a half-position state of said release switch is detected while said audio data is being played.

5. The image capturing apparatus as claimed in claim 1, wherein said record and playback control unit gives an instruction to said play unit to stop playing said audio data and subsequently gives an instruction to said recording unit to undertake a recording quality adjustment processing if a half-position state of said release switch is detected while said audio data is being played.

6. The image capturing apparatus as claimed in claim 1, wherein said play unit includes an audio play unit for playing audio data.

7. The image capturing apparatus as claimed in claim 6, further comprising an external memory device control unit for undertaking control to write data including the image data on said external memory device and to read said audio data from said external memory device through the same data bus.

8. The image capturing apparatus as claimed in claim 1, wherein
   said recording unit records the data including the image data on an external memory device connected detachably to the image capturing apparatus; and
   said play unit plays data recorded on said external memory device.

9. The image capturing apparatus as claimed in claim 1, wherein:
   said recording unit is a memory card; and
   said play unit plays said recorded data by reading said memory card.

10. The image capturing apparatus as claimed in claim 1, wherein said recorded data is the image data recorded in said recording unit.

11. An image capturing method, comprising:
   capturing image data;
   recording data as recorded data, wherein the recorded data includes the image data and audio data separately prepared from the image data, in an operational mode for recording data including the image data;
   playing the recorded data in an operational mode for reading recorded data and for playing said recorded data;

giving an instruction to stop playing the recorded data when a release switch is operated once while playing the recorded data;

giving an instruction to record the image data; and resuming playing of the recorded data substantially immediately after the recording of the image data, wherein giving the instruction to stop playing the recorded data and giving the instruction to record the image data do not switch the operational mode.

12. The image capturing method as claimed in claim 11, further comprising:

obtaining a state of a first switch, which functions to switch the operational mode for recording data including the image data and the operational mode for reading recorded data and for playing said read data; and forcibly suspending said playing regardless of said state of said first switch.

13. The image capturing method as claimed in claim 11, wherein said giving an instruction to start recording the image data detects a completion of recording the image data and gives an instruction to start playing said recorded data, when a recording of the image data is undertaken while said recorded data is being played.

14. The image capturing method as claimed in claim 11, wherein said giving instructions to start recording the image data gives an instruction to start recording the image data after giving instructions to stop playing said recorded data when a half-position state of said release switch and a full-position state of said release switch is detected.

15. The image capturing method as claimed in claim 14, wherein said giving instructions to start recording the image data gives an instruction to start playing said recorded data when an off state of said release switch is detected without detecting said full-position state of said release switch after a half-position state of said release switch is detected while said recorded data is being played.

16. The image capturing method as claimed in claim 11, wherein said giving an instruction to start recording the image data gives instructions to start undertaking a recording quality adjustment processing after giving an instruction to stop playing said recorded data if a half-position state of said release switch is detected while said recorded data is being played.

17. The image capturing method as claimed in claim 11, wherein said playing includes playing audio data.

18. The image capturing method as claimed in claim 17, further comprising undertaking a control to write data including the image data on said external memory device and to read said recorded data from said external memory device through the same data bus.

19. The image capturing method as claimed in claim 11, wherein said recording records the data including the image data on an external memory device connected detachably to the image capturing apparatus; and said playing plays data recorded on said external memory device.

20. The image capturing method as claimed in claim 11, wherein:

said recording is a recording on a memory card; and said playing plays said recorded data by reading said memory card.

21. The image capturing method as claimed in claim 11, wherein said recorded data is the image data recorded in said recording unit.

22. An image capturing apparatus, comprising: an image capturing unit comprising an optical system;

a recording unit comprising a memory device coupled to said image capturing unit, said memory recording image data supplied from said image capturing unit;

a play unit coupled to said recording unit, said play unit reading data recorded in said recording unit and playing the recorded data, wherein said recorded data includes the image data and audio data separately prepared from the image data;

an operating unit comprising a release switch operatively connecting to said recording unit and said play unit, said release switch instructing said recording unit to record the image data and instructing the play unit to play said audio data;

a function setting unit for switching an operation mode for recording the image data and an operational mode for playing the recorded data; and a control unit operatively connecting to said recording unit, said play unit and said operating unit, said control unit supplying a first signal to said play unit and subsequently a second signal to said recording unit, without switching the operational mode, in response to a single operation of said release switch of said operating unit, wherein said first signal supplied to said play unit comprises an instruction signal to stop playing the recorded data and said second signal comprises an instruction signal to start recording the image when said release switch of said operating unit is operated, and wherein playback of the recorded data can be resumed substantially immediately after the recording of the image data.

23. The image capturing apparatus as claimed in claim 22, further comprising audio signal obtaining unit coupled to said recording unit, wherein said recording unit stores therein audio data and image data and said play unit plays the audio data stored in said recording unit, and said control unit generating said first and second signal when said release switch of said operating unit is operated while said play unit plays the audio data.

* * * * *